United States Patent Office 3,663,599
Patented May 16, 1972

3,663,599
METHOD OF PRODUCING VINYLIC
POLYMERIZABLE MONOMERS
Masamitsu Koshimura, Tokyo, Yukinori Haruta and Junichi Matsuzaka, Yokohama, and Shinichi Wako, Fujisawa, Japan, assignors to Nippon Oils and Fats Company Limited, Tokyo, Japan
No Drawing. Filed May 6, 1969, Ser. No. 822,299
Claims priority, application Japan, May 8, 1968, 43/30,658; Oct. 15, 1968, 43/75,082; Nov. 5, 1968, 43/80,376
Int. Cl. C07c $69/80$
U.S. Cl. 260—475 P                9 Claims

ABSTRACT OF THE DISCLOSURE

Reactive monomeric polyester containing a vinylic unsaturated bond and a hydroxyl group, which has the following general formula

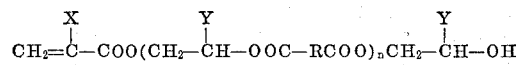

wherein X is hydrogen, methyl or ethyl group, Y is hydrogen, methyl, phenyl or $CH_2Z$ group, in which Z is a halogen or an alkyl group, R represents an aliphatic, alicyclic or aromatic group and $n$ is an integer of 1 to 3, is produced by reacting in one step at least one vinylic unsaturated acid having the general formula

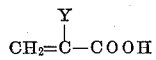

with at least one organic dibasic acid anhydride having the general formula

and at least one monoepoxide having the general formula

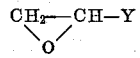

X, Y and R in the above formula having the same meanings as described above, at a temperature lower than 100° C. by using lithium salt alone or in admixture with quaternary ammonium salt as a catalyst.

The present invention relates to novel vinylic polymerizable monomers and a method of producing said monomers, more particularly, production of reactive monomers having vinylic unsaturated group as shown in the following Formula 4 by reacting vinylic unsaturated acid(s) (initiator(s)) having the following Formula 1, as an organic dibasic acid anhydride(s) having the following Formula 2 and monoepoxy compound(s) having the following Formula 3 in the presence of lithium salt as defined hereinafter as a catalyst without causing thermal polymerization of the unsaturated group in the vinylic unsaturated acid.

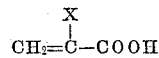   (1)

wherein X is hydrogen, methyl or ethyl group.

   (2)

wherein R is an aliphatic, alicyclic or aromatic group.

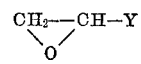   (3)

wherein Y is hydrogen, methyl, phenyl or $CH_2Z$ group (Z is halogen or alkyl group)

   (4)

wherein X, Y and R have the same meanings as described above, provided that when two or more Y and R groups are contained in one molecule, Y and R may be same or different groups, that is, they may be mixture systems and $n$ is an integer of 1 to 3.

In this case, the ring breakage of the monoepoxy compound mainly occurs according to the following Formula 5 and therefore, the products are shown by the above Formula 4, but the ring breakage as shown in the following Formula 6 probably occurs somewhat and consequently the products obtained in the present invention may be a mixture of the products having the following Formulae 7 and 8, wherein the position of carbon to be bonded with Y varies. Accordingly, although in the above Formula 4, the right end is shown by hydroxyl group of the secondary alcohol, the product having hydroxyl group of the primary alcohol as shown in the following Formula 8 is naturally mixed and the expression of the above Formula 4 of the products means also the mixture of such products having the Formulae 7 and 8.

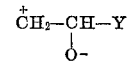   (5)

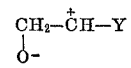   (6)

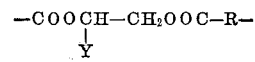   (7)

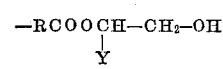   (8)

In general, it has been known that an initiator, a dibasic acid anhydride (abridged as acid anhydride hereinafter) and a monoepoxy compound take place polyesterification reaction at a high temperature of 130 to 150° C. in the absence of a catalyst, and the reactivity decreases rapidly at a temperature lower than such a temperature. In this invention, when the reaction for producing the product having the above described Formula 4 is carried out, it is desirable to effect the reaction at a temperature lower than 100° C. in order not to polymerize the vinyl group. Because the reaction system contains acrylic acid, methacrylic acid or α-ethyl acrylic acid (abridged these acids as the vinyl unsaturated acid), which is readily polymerized rapidly at a temperature higher than 100° C.

On the other hand, in case of absence of catalyst the reaction velocity is very slow and the reaction does not substantially proceed and consequently, the reaction of the present invention needs a catalyst which can cause the esterification reaction at a temperature lower than 100° C. After many investigations the inventors have found that lithium salt can promote the reaction effectively at relatively lower temperature and have succeeded in production of high quality of monomeric polyesters having the above Formula 4 in a high yield.

Such products, when $n$ is large are considered to be sorts of polyesters in structure, but in view of presence of the vinylic unsaturated group in the molecule they are considered to be monomers, therefore they are referred to as "monomer" hereinafter.

The monomers of the present invention can be used in various fields by utilizing the reactivity of the vinyl group and the functional group (terminal hydroxyl group) present in the molecule. Namely, the monomers can be copolymerized with the other comonomers containing polymerizable unsaturated groups, such as, styrene, methacrylates, acrylates, acrylonitriles, butadiene, vinyl acetate, etc., and further, can form cross-linkage by utilizing the functional group, for example, can form cross-linkage through a reaction of the terminal hydroxyl group with polyisocyanate and the like. Moreover, the monomers can be used for thermoplastic molding, film, sheet, filament and the like and are useful broadly in the same field as the thermosetting plastics and provide new material in a field of high molecular weight compound. Furthermore, the monomers can be used for an improver of plastics, synthetic fiber, film and sheet or for main component.

The first merit of the invention consists in that the monomers can be produced at a temperature lower than 100° C. without causing thermal polymerization of the vinyl group by using the catalyst according to the present invention and the reaction velocity is same as or higher than that at a high temperature in the absence of catalyst. Furthermore, when using some catalyst, if the reaction proceeds to some extent, the reaction reaches equilibrium and the progress of the reaction stops, while according to the catalyst of the present invention, the reaction ratio is very high and a reaction percentage of more than 98% can be fairly easily attained.

The second merit consists in that the catalyst added in the reaction precipitates again at the end of the reaction and after completed the reaction, a major part of the catalytic component in the reaction product can be removed by only a filtration of the reaction product and consequently, an amount of the catalytic component remained in the reaction product is very small and such an amount is not problem in practice. Namely, complicated purification step after the reaction is not substantially necessary.

The third merit consists in that in the reaction using the catalyst of the present invention, diester type products having the following Formula 9

(9)

which contain vinylic unsaturated acids in both the terminals in one molecule are not substantially produced and the monoester type products having the above described Formula 4, wherein vinylic unsaturated acid component is contained in only one terminal, are produced. Accordingly, even if these products are added with a slight amount of a radical catalyst, such as an organic peroxide to polymerize the unsaturated group based on the unsaturated acid component, a cross-linked polymeric gel is not formed and a linear thermoplastic polymer is formed.

The fourth merit consists in that the monomers having the above Formula 4 are produced in one step operation and a plurality of steps are not necessary. In general, when the monomer having the complicated configuration as the product of the present invention is produced, the following procedure is generally necessitated. That is, in the first step a vinylic unsaturated acid is reacted with a monoepoxy compound to form an initial ester. For example, acrylic acid and ethylene oxide are reacted to produce hydroxyethyl acrylate. Then in the second step, the initial ester is reacted with an acid anhydride to form a second ester and in the third step the second ester having a terminal carboxyl group is reacted with a monoepoxy compound to form the object product having the above Formula 4. However, according to the method of the present invention it is possible to obtain the object product having the above Formula 4 in one step, from the vinylic unsaturated acid, the acid anhydride and the monoepoxy compound. Therefore the present invention is very advantageous. Furthermore, in this invention, the value of $n$ in the configuration of the Formula 4 can be controlled as described below, by the feeding ratio of the above described three starting materials. With respect to one mole of vinylic unsaturated acid, when the acid anhydride is 1 mole and the epoxy compound is 2 moles, the monomer wherein $n$ is 1 can be obtained, when the acid anhydride is 2 moles and the monoepoxy compound is 3 moles, the monomer wherein $n$ is 2 can be obtained and when the acid anhydride is 3 moles and the monoepoxy compound is 4 moles, the monomer wherein $n$ is 3 can be obtained. In practice, the amount of the monoepoxy compound added is somewhat larger than the calculated amount based on the reason as described hereinafter. In case of preparing $n$ of 4 or more, it is rather difficult to promote the esterification reaction, because of the viscosity in the reaction and the state of starting materials. And further, such monomers have no particular advantage in view of the utilization and properties as compared with the monomers, wherein $n$ is 3, and are not valuable.

The fifth merit is attained when a lithium salt of vinylic unsaturated acid corresponding to vinylic unsaturated acid to be used as one component of the starting materials is used as the reaction catalyst. For example, when acrylic acid is one component of the starting materials, lithium acrylate is used as the catalyst. In the reaction of the present invention, when any other lithium salt than such lithium salts is used as the catalyst, the negative group bonded to lithium in the lithium compound is separated in the reaction from lithium and reacts with the monoepoxy compound of the reaction components to produce by-product. But, when lithium salt of the same vinylic unsaturated acid as the vinylic unsaturated acid to be used as one component of the starting materials is used as the catalyst, the negative group bonded to lithium is the component of the vinylic unsaturated compound of the starting material and therefore any by-product is not formed and is not mixed in the reaction system and the resulting product is very high in the purity.

However, in practice, the amount of catalyst added is not so large, so that even if usual lithium salt catalyst is used, the amount of by-produced polyester resulting from the negative group of the catalyst is small and there is no problem practically, but when purity grade in the content of the vinylic unsaturated group is required, the use of the lithium salt of the same vinylic unsaturated acid as used as one component of the starting materials is very effective.

The sixth merit consists in that when the reaction is completed the catalytic component precipitates and that this precipitate consists mainly of lithium salt of the vinylic unsaturated acid used as one component of the starting materials. Even when usual lithium salt catalyst, for example, lithium chloride is used as the reaction catalyst, the precipitate obtained by the completion of reaction is mainly the lithium salt of the vinylic unsaturated acid, which has been used as one component of the starting materials and this salt has a completely same reactivity as novel lithium salt of the same vinylic unsaturated acid. And consequently the filtered cake can be reused repeatedly for the next reaction as such. Thus, as the filtered cake in the preceding reaction can be used in the next reaction, it is merely necessary in the next operation to add a little amount of fresh lithium salt catalyst corresponding to the loss in the preceding operation. This is very advantageous economically.

The present invention includes the above described many excellent merits.

U.S. Pats. Nos. 3,376,271, 3,376,272 and 3,376,273 disclose methods for producing polyester resin, in which an initiator containing 3 or more carboxyl groups, phenolic hydroxyl groups or alcoholic hydroxyl groups, for example, polymethacrylic acid or a copolymer containing methacrylic acid is reacted with an acid anhydride and a monoepoxy compound in the absence of catalyst or in the presence of tertiary amine at a temperature of lower than 150° C., but in this case, the initiator has no polymerizable vinyl group and accordingly, the reaction can be effected at a high temperature, such as 120 to 150° C. and these prior arts are essentially different from the present invention, wherein the polyesterification reaction is taking place at a temperature lower than 100° C. by using lithium salt in order not to impair vinyl group in the vinylic unsaturated acid to obtain monomer containing vinyl group.

U.S. Pat. No. 3,150,118 discloses production of monomers containing vinylic unsaturated acid as a base material and carboxylic acid as terminal group, in which a vinylic unsaturated acid and a monoepoxy compound are reacted to form hydroxyalkyl ester of vinylic unsaturated acid as an initial ester and the initial ester is reacted with an acid anhydride to obtain an object compound. In this reaction, lithium salt as in the present invention is not used as the catalyst. Accordingly, the product obtained in this prior art is entirely different from the present invention in view of the product, the production step and the use of catalyst.

Belgian Pat. No. 708,068 describes that in production of β-hydroxyalkyl ester of an organic acid by reacting an organic acid with an alkylene oxide, sodium or lithium salt is used at a temperature lower than 125° C., but this reaction system does not contain an acid anhydride and it does not aim at a breakage of a ring of acid anhydride by means of such a catalyst, while the present invention aims at a polyesterification through the breakage of the ring of the acid anhydride and in the resulting product this prior art is entirely different from the present invention.

The present invention having the above mentioned merits is carried out under the following conditions:

The vinylic unsaturated acids have the above described Formula 1 and include acrylic acid, methacrylic acid, α-ethylacrylic acid or these acids may be used in mixture thereof.

The dibasic acid anhydrides have the above described formula and include phthalic acid anhydride, tetrahydrophthalic acid anhydride, hexahydrophthalic acid anhydride, tetrachlorophthalic acid anhydride, succinic acid anhydride, hexachloroendomethylene tetrahydrophthalic acid anhydride, 1,4-endomethylene tetrahydrophthalic acid anhydride, methyl - 1,4 - endomethylene tetrahydrophthalic acid anhydride or alkenyl succinic acid anhydrides having 4 to 20 carbon atoms, or these acids may be used in mixtures thereof. Particularly, phthalic acid anhydride and mixtures of phthalic acid anhydride with the other dibasic acids are preferable.

The monoepoxy compounds have the above described formula and include ethylene oxide, propylene oxide, butylene oxide, styrene oxide, epichlorohydrin or methylepichlorohydrin, or mixtures thereof and particularly, ethylene oxide, propylene oxide and mixtures of ethylene oxide or propylene oxide with the other monoepoxides are preferable.

The lithium salt catalysts to be used in the present invention include lithium halide, such as lithium chloride, lithium bromide and lithium iodide; lithium salts of organic acids, for example, lithium salts of fatty acids having 1 to 10 carbon atoms such as lithium formate, lithium acetate, lithium caproate, lithium capriate, lithium acrylate, lithium methacrylate, lithium α-ethylacrylate, lithium benzoate and also lithium hydroxide and lithium carbonate which can form salts with the vinylic unsaturated acid in the reaction system can be used. Of course, mixtures of these salts can be used. Lithium salts of fatty acids having 11 or more carbon atoms have a low lithium concentration in one moleclue and require a large amount, so that the efficiency is low. Among them, the usually used lithium salt catalysts are those in which the cost calculated into lithium atom is relatively inexpensive, for example, lithium chloride, lithium acetate, lithium benzoate, lithium hydroxide and lithium carbonate. Particularly, lithium acrylate, lithium methacrylate and lithium α-ethylacrylate have the fifth merit as mentioned above and are useful. Furthermore, as shown in the sixth merit, the lithium salts of the vinylic unsaturated acids which have precipitated and been filtered off from the preceding reaction are most useful in practice.

The amount of the lithium salt catalyst added is 0.01 to 1.0% by weight, preferably, 0.1 to 0.5% by weight based on the total amount of the three component reactants, which is calculated into lithium atom. When the lithium atom is less than 0.01% by weight, the catalytic activity does not substantially appear, while when the lithium atom is more than 1%, the reaction promotability is not substantially different from the case of 1% by weight and the addition of an excess amount signifies economically and further, polymerization of vinylic unsaturated group may occur somewhat and the addition of such an amount is rather obstacle.

The inventors have found that organic quaternary ammonium salts can be used together with the lithium salts and that in this case the use of a slight amount of the quaternary ammonium salts together with the lithium salts promotes the reaction rapidly. However, if an excess amount of the organic quaternary ammonium salt is used, the product is considerably colored and in the resulting monomeric ester the diester type products having the above described Formula 9 ,are by-produced and the cross-linked gel is probably formed in the vinylic polymerization by means of a radical catalyst. An appropriate amount of the organic quaternary ammonium salt used is 0.2 to 2.0 parts of weight based on 1 part by weight of lithium atom.

The organic quaternary ammonium salts include trimethylbenzylammonium chloride, triethylbenzylammonium chloride and triethylbenzylammonium bromide.

The polyesterification reaction of the present invention is carried out at a temperature lower than 100° C., preferably 90 to 60° C. and at a temperature higher than 100° C. the polymerization of vinyl group begins and at a temperature lower than 60° C. the reaction is slow and such a temperature is not preferable practically.

The pressure of the reaction varies depending upon vapour pressure of the monoepoxy compound of the starting material and the reaction temperature selected, but even when the monoepoxy compound has a low boiling point, both atmospheric pressure system and pressure system may be used.

The reaction period according to the present invention varies within broad range depending upon the kinds of the starting materials and the catalyst amount and cannot be defined absolutely.

In the reaction of the present invention, the reaction is generally completed in a short time by using the monoepoxy compounds in a somewhat excess amount over the theoretically required amount.

The reaction may be carried out by adding an appropriate amount of coinventional polymerization inhibitor, such as tert-butylcatechol, hydroquinone, monomethyl hydroquinone, etc., and further a proper solvent such as toluene, benzene, butyl acetate, etc., may be used.

The process for feeding the starting materials can be effected as follows:

Namely, in both atmospheric pressure system and pressure system, the vinylic unsaturated acid, the dibasic acid anhydride and the catalyst and further if necessary, a solvent are added simultaneously into a reaction vessel and then air in the reaction vessel is substituted with nitrogen and the temperature is raised. Thereafter, before the temperature is not raised too high, about ¼ of a predetermined amount of the monoepoxide is added thereto and the temperature is raised to a given temperature, after which the remaining monoepoxide is gradually added to the reaction vessel and the resulting mixture is reacted, while a rapid generation of reaction heat being prevented or before the monoepoxide is added thereto, the temperature in the reaction vessel is raised to a given value and then a predetermined amount of monoepoxide is gradually added and the resulting mixture is reacted, while a rapid generation of reaction heat being prevented.

The following examples are given in illustration of the present invention and are not intended as limitations thereof.

EXAMPLE 1

Into a solution of 0.4 g. of tert-butylcatechol in 720 g. of acrylic acid were added 42.5 g. of lithium chloride and 1,332 g. of phthalic acid anhydride and the resulting mixture was charged into a closed vessel. After the air in the vessel was completely substituted with nitrogen, the vessel was heated to about 80° C., and then 968 g. of ethylene oxide was gradually pumped into the vessel.

After the addition of ethylene oxide was completed, the acid value of the reaction mixture was measured and the reaction was continued until the acid value was less than 2.

After the completion of the reaction, the pressure in the reaction system was reduced to remove unreacted ethylene oxide and the residue was taken out and a pale yellow slurry was obtained. Then the slurry was filtered under pressure to separate cakes of the catalyst component, whereby 2,580 g. of an object product was obtained, which were pale yellow, transparent and somewhat viscous liquid. The product had an ester value of 530, a hydroxyl value of 190 and a bromine value of 51.0.

EXAMPLE 2

Into a four neck flask of 1 l. capacity equipped with a stirrer, a reflux condenser, a thermometer and a dropping funnel were charged 172 g. of methacrylic acid, 242 g. of phthalic acid anhydride, 15.3 g. of lithium chloride and 80 mg. of tert-butylcatechol. The resulting mixture was heated up to 90° C. and 262 g. of propylene oxide was gradually added thereto through the dropping funnel. After the addition of propylene oxide was completed, the resulting mixture was aged until the acid value was less than 5 while maintaining the temperature at 90° C.

After the completion of the aging reaction, the resulting slurry was filtered under a reduced pressure to obtain 570 g. of an object product, which was colorless, transparent and somewhat viscous liquid and had an ester value of 460, a hydroxyl value of 180 and a bromine value of 43.

EXAMPLE 3

Into the same vessel as described in Example 1 were charged 215 g. of methacrylic acid, 905 g. of phthalic acid anhydride, 40 g. of lithium bromide, 0.5 g. of tert-butylcatechol and 450 g. of benzene, and then 608 g. of propylene oxide were pumped into the vessel in the same manner as described in Example 1, and the resulting mixture was reacted.

After the completion of the reaction, unreacted propylene oxide and the solvent were removed completely under a reduced pressure, and the residue was filtered to obtain 1,540 g. of an object product.

Analytical data showed that the product was an ester containing one methacrylic acid residue and three phthalic acid anhydride residues in one molecule. The product had an ester value of 492, a hydroxyl value of 85 and a bromine value of 21.

EXAMPLE 4

Into a four neck flask of 1 l. capacity equipped with a reflux condenser, a stirrer, a thermometer and a dropping funnel were charged 202 g. of methacrylic acid, 296 g. of phthalic acid anhydride, 15.7 g. of a mixed catalyst of lithium chloride and trimethylbenzylammonium chloride in a mixing ratio of 21:1, 0.2 g. of p-tert-butylcatechol and 90 g. of propylene oxide, and the resulting mixture was heated while stirring. When the inner temperature of the flask reached 55-60° C., 200 g. of propylene oxide in the dropping funnel were dropped carefully. Propylene oxide (hereinafter abridged as PO) to be dropped was controlled to such an amount that the dropped PO did not go out into air through the reflux condenser and that the inner temperature of the flask did not exceed 100° C. The reaction system was heterogeneous for about 40 minutes, but thereafter the phthalic acid anhydride in the system dissolved and the reaction system got into a homogeneous system. Generally, in the dissolution, the reaction system is heated fairly high and therefore it is preferable to cool the reaction system, if necessary. The dropping of PO was completed in about 3 hours and then the resulting mixture was aged for 2 hours to complete the reaction.

The reaction mixture was filtered through a filter, and excess PO was removed from the filtrate to obtain 700 g. of an object product.

The obtained product was colorless and transparent and had an acid value of 10.8, a hydroxyl value of 168, a bromine value of 43 and a molecular weight of 330. The purity was 98.5% by calculating from the double bond.

Then, 16 parts of the thus obtained resinous product were copolymerized with 4.4 parts of methylmethacrylate, 29.6 parts of butyl acrylate and 50 parts of styrene, and the resulting film had a glossy surface. Furthermore, when the above mentioned resinous product alone was polymerized by the use of benzoyl peroxide, a flexible and moldable polymer was obtained.

EXAMPLE 5

Into a four neck flask of 5 l. capacity were charged 1,013 g. of methacrylic acid, 1,480 g. of phthalic acid anhydride, 83 g. of a mixed catalyst of lithium chloride and trimethylbenzylammonium bromide in a mixing ratio of 10:1, 1.2 g. of p-tert-butylcatechol and 450 g. of PO, and then 1,000 g. of the remaining PO were added dropwise thereto in the same manner as described in Example 4. After 5 hours, 3,420 g. of an object product were obtained, which had an acid value of 9.8, a hydroxyl value of 170, a bromine value of 43 and a molecular weight of 310.

EXAMPLE 6

In the same manner as described in Example 4, 169 g. of acrylic acid, 296 g. of phthalic acid anhydride, 290 g. of PO, 15.3 g. of a mixed catalyst of lithium chloride and triethylbenzylammonium chloride in a mixing ratio of 20:2, and 0.2 g. of p-tert-butylcatechol were reacted for 3 hours to obtain 670 g. of a pale yellow object product having an acid value of 10.2, a hydroxyl value of 175, a bromine value of 46 and a molecular weight of 310.

EXAMPLE 7

A mixture of 152 g. of methacrylic acid, 414 g. of phthalic acid anhydride, 280 g. of PO, 16.8 g. of a mixed catalyst of lithium bromide and triethylbenzylammonium bromide in a mixing ratio of 20/1.5 and 0.25 g. of monomethylhydroquinone was treated for 5 hours in the same manner as described in Example 4 to obtain an object product having an acid value of 6.8, a hydroxyl value of 120, a bromine value of 28.5 and a molecular weight of 460. The yield was 98% based on the theoretical value.

EXAMPLES 8-11

The treatment in these examples was effected in the same manner as described in Example 4. The results are shown in the following Table 1.

TABLE 1

| Example number | 8 | 9 | 10 | 11 |
|---|---|---|---|---|
| Vinylic unsaturated acid, mole | AA 1 | MAA 1 | MAA 1 | AA 1 |
| Acid anhydride, mole | PAn 1 | PAn 1 | SAn 1 | SAn 1 |
| Monoepoxy compound, mole | ED 2.2 | EO 2.3 | EO 2.1 | EO 2.2 |
| Catalyst, grams | A·Li 10.6 | MA·Li 13.2 | MA·Li 12.1 | A·Li 9.9 |
| Inhibitor, grams | t·B.C. 0.1 | HQ 0.1 | t·B.C. 0.1 | HQ 0.1 |
| Reaction time (hours) | 8 | 9 | 9 | 8 |
| Yield (percent) based on the theoretical value | 96.8 | 98.0 | 92.0 | 93.0 |
| Acid value [1] | 8.5 | 7.7 | 10.5 | 9.8 |
| Hydroxyl value [1] | 180 | 170 | 205 | 221 |
| Bromine value | 51.0 | 49.2 | 57.2 | 61.0 |
| Molecular weight [2] | 310 | 320 | 280 | 260 |

[1] Shown by mg. KOH/g.  [2] Determined by vapour pressure osmometer.

When the monomer obtained in Example 11 and acrylic acid were copolymerized, and the resulting copolymer was a water soluble typed polymer, which was coated, the obtained coated film was glossy and flexible.

In the above Table 1, the abbreviations show following compounds, respectively:

AA: acrylic acid
MAA: methacrylic acid
SAn: succinic acid anhydride
EO: ethylene oxide
PAn: phthalic acid anhydride
A·Li: lithium acrylate
MA·Li: lithium methacrylate
t·B.C.: tert-butylcatechol
HQ: hydroquinone

EXAMPLE 12

Into a closed autoclave of 500 l. capacity were charged 72 kg. of acrylic acid, 148 kg. of phthalic acid anhydride, 12 kg. of lithium acrylate and 70 g. of tert-butylcatechol, and the autoclave was heated up to 70° C. while stirring. Then, 110 kg. of ethylene oxide were gradually pumped into the autoclave. In this experiment, the air in the autoclave had previously been substituted with nitrogen.

After the pumping of ethylene oxide was completed, the resulting mixture was aged until the acid value of the mixture got into less than 2, while measuring the acid value at intervals. The unreacted ethylene oxide was removed from the reaction mixture under a reduced pressure, and the precipitated catalyst was filtered off to obtain 293 kg. of an object product, which had a number average molecular weight of 305, an ester value of 550, a hydroxyl value of 175 and a bromine value of 52.

EXAMPLE 13

Into a mixture of about 28 kg. (net basis: 11 kg.) of the cake catalyst obtained in Example 12, 65.5 kg. of acrylic acid, 134 kg. of phthalic acid anhydride and 64 g. of hydroquinone were added 100 kg. of ethylene oxide, and the reaction was carried out in the same manner as described in Example 12 to obtain 266 kg. of an object product. Analytical data of the product agreed with those of the product obtained in Example 12 within the analytical error.

EXAMPLE 14

About 23 kg. (net basis: 8.8 kg.) of the cake catalyst obtained after used the cake in Example 12 for several reactions were added with 3.2 kg. of freshly prepared lithium acrylate, and by using the resulting catalyst the reaction was carried out in the exactly same manner as described in Example 12 to obtain an object product. Yield and analytical data of thus obtained product agreed with those of the product obtained in Example 12 within the analytical error.

EXAMPLE 15

Into a four neck flask of 2 l. capacity were charged 172 g. of methacrylic acid, 296 g. of phthalic acid anhydride, 35.2 g. of lithium methacrylate and 0.2 g. of hydroquinone monomethyl ether, and the resulting mixture was heated up to 80° C. while stirring, and then a mixture of 139.2 g. of propylene oxide and 203.6 g. of epichlorohydrin was added dropwise thereto through a dropping funnel. After the completion of the addition, the resulting mixture was aged until the acid value got into less than 7.0, while measuring the acid value. After the aging reaction was completed, the crystallized cake catalyst was filtered off under pressure and unreacted propylene oxide and epichlorohydrin were removed from the filtrate under a reduced pressure to obtain 735 g. of an object product having an ester value of 440, a hydroxyl value of 145 and a bromine value of 41, which contained 9.2% of chlorine.

When the product was added with a slight amount of benzoyl peroxide and the resulting mixture was heated to effect polymerization, the resulting rigid jelly-like polymer was soluble in organic solvents, such as acetone, methanol, etc.

It was confirmed that the above mentioned product was a monoester type vinyl monomer containing one vinylic unsaturated group in one molecule.

It was possible that the catalyst filtered and separated from the reaction mixture was reused repeatedly.

EXAMPLE 16

Into a four neck flask of 1 l. capacity equipped with a reflux condenser were charged 93.6 g. of acrylic acid, 385 g. of phthalic acid anhydride, 26 g. of lithium acrylate, 35 g. of toluene and 14 mg. of tert-butylcatechol, and the resulting mixture was heated up to 70° C. Then, 264 g. of propylene oxide were added dropwise to the mixture through a dropping funnel, and the resulting mixture was reacted at a temperature of about 80° C. until the acid value got into less than 10. After the reaction was completed, the reaction mixture was filtered and unreacted propylene oxide and solvent were removed under a reduced pressure to obtain 650 g. of a pale yellow viscous product. Analytical data showed that the product had an ester value of 528, a hydroxyl value of 100, a bromine value of 30 and a molecular weight of 540, and it was found that the product was a polyester type vinyl monomer, in which two molecules of phthalic acid anhydride were bonded with one molecule of acrylic acid through propylene oxide (total propylene oxide molecules: three molecules).

EXAMPLE 17

Into a mixture of 151 g. of acrylic acid, 324 g. of hexahydrophthalic acid anhydride, 22 g. of lithium acetate and 10 mg. of hydroquinone were added 269 g. of propylene oxide in the same manner as described in Example 16 and the resulting mixture was reacted. After the reaction was completed, the reaction mixture was treated in the same manner as described in Example 16 to obtain 660 g. of an object product. Analytical data showed that the product had an ester value of 501, a hydroxyl value of 169 and a bromine value of 40.

EXAMPLE 18

Into a flask equipped with a reflux condenser were charged 504 g. of acrylic acid, 1,700 g. of phthalic acid anhydride, 0.7 g. of tert-butylcatechol and 63 g. of lithium hydroxide monohydrate, and the resulting mixture was heated up to 80° C. while stirring. Then, 1,276 g. of propylene oxide were gradually added thereto through a dropping funnel. After the addition of propylene oxide was completed, the resulting mixture was aged until the acid value of the mixture got into less than 10 while maintaining the temperature at 90° C.

The resulting slurry raw product was filtered immediately after the reaction, and unreacted propylene oxide was removed from the filtrate under a reduced pressure while keeping the temperature of the filtrate at about 70° C. to obtain 3,140 g. of an object product.

Analytical data showed that the product had an ester value of 480, a hydroxyl value of 190 and a bromine value of 28. The residual cake was lithium methacrylate, which was able to be reused repeatedly.

EXAMPLE 19

In the same manner as described in Example 18, 662 g. of acrylic acid, 1,360 g. of phthalic acid anhydride, 0.7 g. of tert-butylcatechol, 59 g. of lithium carbonate and 1,160 g. of propylene oxide were treated to obtain 2,780 g. of an object product having an ester value of 496, a hydroxyl value of 172 and a bromine value of 42.

EXAMPLES 20–25

By using the same reaction vessel and procedure as described in Example 16, various vinylic unsaturated acids, dibasic acid anhydrides and monoepoxy compounds as shown in the following Table 2 were reacted to obtain various monomers.

The experimental conditions and the analytical data of the respective examples are shown in the following Table 2.

In these examples, 0.2 g. of tert-butylcatechol was added as a polymerization inhibitor, respectively, and after the reaction, unreacted monoepoxides were completely removed under a reduced pressure.

Hy = 1,4-endomethylene-tetrahydrophthalic acid anhydride;
MHy = methyl-1,4-endomethylene-tetrahydrophthalic acid anhydride;
TCP = tetrachlorophthalic acid anhydride;
EO = ethylene oxide;
PO = propylene oxide;
BO = butylene oxide;
SO = styrene oxide;
ECH = epichlorohydrin;
MECH = methyl epichlorohydrin.

What is claimed is:

1. A method of producing a monomeric polyester containing a vinylic unsaturated bond and a hydroxyl group which comprises reacting in one step at least one vinylic unsaturated acid having the formula $$CH_2=\overset{X}{\underset{|}{C}}-COOH$$

wherein X is hydrogen, methyl or ethyl group, at least one organic dibasic acid anhydride having the formula

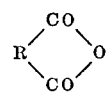

wherein R is

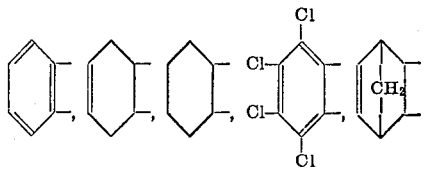

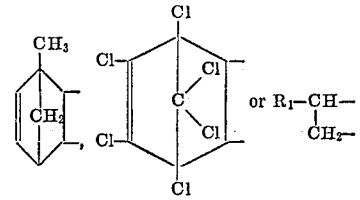

$R_1$ being hydrogen or an alkenyl group having 4 to 20

TABLE 2

| Example number | 20 | | 21 | | 22 | | 23 | | 24 | | 25 | |
|---|---|---|---|---|---|---|---|---|---|---|---|---|
| Vinylic unsaturated acid, grams | EAA | 144 | AA | 108 | MAA | 172 | EAA | 169 | AA | 144 | MAA | 126 |
| Acid anhydride, grams | PAn | 106 | SAn | 75 | THP | 304 | PAn | 125 | Hy | 164 | DSA | 194 |
|  | HET | 268 | TCP | 214 |  |  | MHy | 150 | PAn | 148 | PAn | 107 |
| Monoepoxy compound, grams | EO | 95 | PO | 122 | EO | 132 | PO | 176 |  |  | EO | 91 |
|  | BO | 84 | SO | 180 | MEH | 160 | ECH | 78 | EO | 211 | PO | 86 |
| Catalyst, grams | (a) | 32.0 | (b) | 10.4 | (c) | 35.4 | EAA[d] | 42.8 | (e) | 50.3 | (f) | 27.6 |
| Reaction time, hours | 9 | | 10 | | 9 | | 10 | | 10 | | 10 | |
| Yield (percent) based on the theoretical value | 98.0 | | 98.5 | | 98.5 | | 98.1 | | 98.7 | | 97.6 | |
| Analytical data: | | | | | | | | | | | | |
| Acid value [1] | 8.9 | | 9.1 | | 7.9 | | 9.9 | | 7.7 | | 9.5 | |
| Hydroxyl value [1] | 115 | | 128 | | 160 | | 148 | | 175 | | 140 | |
| Bromine value | 29 | | 35 | | 38 | | 41 | | 43 | | 40 | |
| Molecular weight [2] | 470 | | 445 | | 355 | | 390 | | 335 | | 390 | |

[1] Shown by mg. KOH/g.  [2] Determined by vapour pressure osmometer.  [a] Lithium benzoate.  [b] Lithium formate.  [c] Lithium caproate.  [d] Lithium salt.  [e] Lithium capriate.  [f] Lithium methacrylate.

In the above Table 2, the abbreviations show following compounds, respectively:

AA = acrylic acid;
MAA = methacrylic acid;
EAA = α-ethylacrylic acid;
SAn = succinic acid anhydride;
DSA = dodecenylsuccinic acid anhydride;
PAn = phthalic acid anhydride;
THP = tetrahydrophthalic acid anhydride;
HET = hexachloro-endomethylene-tetrahydrophthalic acid anhydride;

carbon atoms, and at least one monoepoxide having the formula

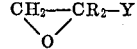

wherein Y is hydrogen, methyl, ethyl, phenyl or $-CH_2Cl$ group and $R_2$ is hydrogen or methyl group, provided that when $R_2$ is methyl group, Y is $-CH_2Cl$ group, at a temperature lower than 100° C. in the presence of a lithium salt selected from the group consisting of a lithium halide, lithium salts of fatty acids having 1 to 10 carbon atoms, lithium benzoate, lithium hydroxide, lithium carbonate, lithium acrylate, lithium methacrylate and lithium α-ethylacrylate to produce the monomeric polyester having the formula $$CH_2=\overset{X}{\underset{|}{C}}-COO(CH_2-\overset{Y}{\underset{|}{C}}R_2-OOC-RCOO)_nCH_2-\overset{Y}{\underset{|}{C}}R_2-OH$$

wherein X, Y, R, and $R_2$ have the same meanings as described above, provided that when two or more Y and R groups are contained in one molecule, Y and R may be the same or different, and $n$ is an integer of 1 to 3.

2. The method as claimed in claim 1, wherein said dibasic acid anhydride is phthalic acid anhydride or a mixture of phthalic acid anhydride and at least one of the other dibasic acid anhydrides.

3. The method as claimed in claim 1, wherein said monoepoxide is ethylene oxide or mixtures of ethylene oxide and at least one of the other monoepoxides.

4. The method as claimed in claim 1, wherein said monoepoxide is propylene oxide or mixtures of propylene oxide and at least one of the other monoepoxides.

5. The method as claimed in claim 1, wherein said monoepoxide is a mixture of ethylene oxide and propylene oxide.

6. The method as claimed in claim 1, wherein said lithium salt is lithium chloride or lithium acetate.

7. The method as claimed in claim 1, wherein an amount of said lithium salt added is 0.01 to 1.0% by weight in lithium atom based on the total amount of said vinylic unsaturated acid, said monoepoxide and said dibasic acid anhydride.

8. A method of producing a monomeric polyester containing a vinylic unsaturated bond and a hydroxyl group which comprises reacting in one step at least one vinylic unsaturated acid having the formula $$CH_2=\overset{X}{\underset{|}{C}}-COOH$$

wherein X is hydrogen, methyl or ethyl group, at least one organic dibasic acid anhydride having the formula

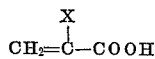

wherein R is

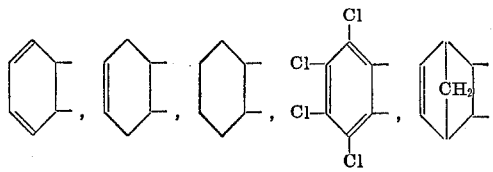

 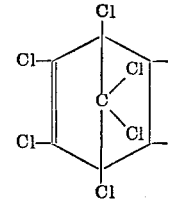 or $R_1-CH-$
$\phantom{or R_1-}\overset{|}{C}H_2-$ $R_1$ being hydrogen or an alkenyl group having 4 to 20 carbon atoms, and at least one monoepoxide having the formula

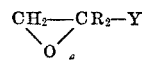

wherein Y is hydrogen, methyl, ethyl, phenyl or —$CH_2Cl$ group and $R_2$ is hydrogen or methyl group, provided that when $R_2$ is methyl group, Y is —$CH_2Cl$ group, at a temperature lower than 100° C. in the presence of a lithium salt selected from the group consisting of a lithium halide, lithium salts of fatty acids having 1 to 10 carbon atoms, lithium benzoate, lithium hydroxide, lithium carbonate, lithium acrylate, lithium methacrylate and lithium α-ethylacrylate and a quaternary ammonium salt selected from the group consisting of trimethyl benzyl ammonium chloride, triethyl benzyl ammonium chloride, triethyl benzyl ammonium bromide and trimethyl benzyl ammonium bromide to produce the monomeric polyester having the formula.

$$CH_2=\overset{X}{\underset{|}{C}}-COO(CH_2-\overset{Y}{\underset{|}{C}}R_2-OOC-RCOO)_nCH_2-\overset{Y}{\underset{|}{C}}R_2-OH$$

wherein X, Y, R and $R_2$ have the same meanings as described above, provided that when two or more Y and R groups are contained in one molecule, Y and R may be same or different groups and $n$ is an integer of 1 to 3.

9. The method as claimed in claim 8, wherein said quaternary ammonium salt is added in an amount of 0.2 to 2.0 parts by weight based on 1 part of lithium atom.

References Cited

UNITED STATES PATENTS 3,174,995  3/1965  Cour _____ 260—486 B
3,367,992  2/1968  Bearden _____ 260—475 P
3,433,824  3/1969  Horsley _____ 260—486 B LORRAINE A. WEINBERGER, Primary Examiner E. J. SKELLY, Assistant Examiner U.S. Cl. X.R.

260—76, 80.75, 83.5, 85.5 ES, 86.1 E, 86.1 R, 86.7, 485 G, 486 B